S. H. MORTENSEN.
TURBO-ROTOR CONSTRUCTION.
APPLICATION FILED DEC. 21, 1908.
1,003,120.
Patented Sept. 12, 1911.
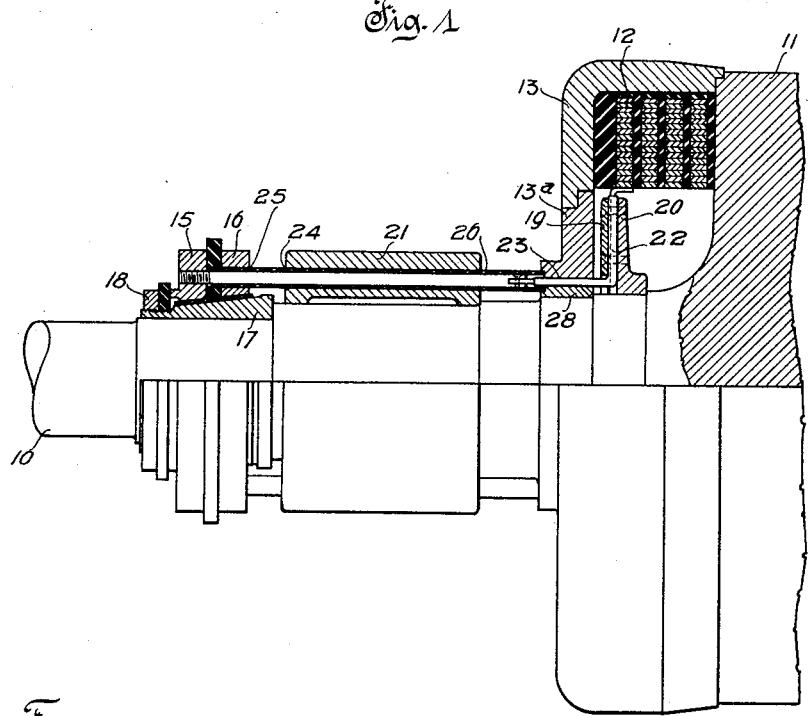
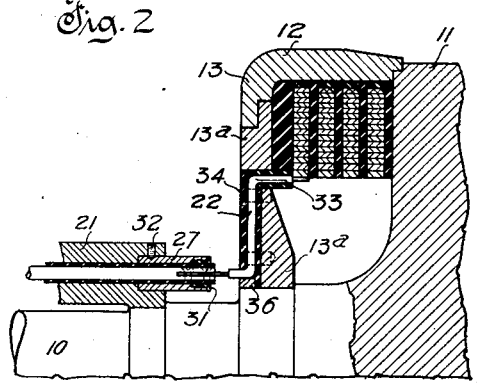
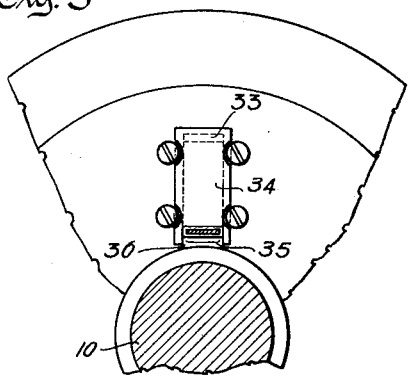
Witnesses:
Rob. E. Stoll
Chas. L. Byron
Inventor
Sören H. Mortensen
By Chas. E. Lord
Attorney

UNITED STATES PATENT OFFICE.

SÖREN H. MORTENSEN, OF MILWAUKEE, WISCONSIN, ASSIGNOR TO ALLIS-CHALMERS COMPANY, A CORPORATION OF NEW JERSEY.

TURBO-ROTOR CONSTRUCTION.

1,003,120. Specification of Letters Patent. Patented Sept. 12, 1911.

Application filed December 21, 1908. Serial No. 468,627.

*To all whom it may concern:*

Be it known that I, SÖREN H. MORTENSEN, a subject of the King of Denmark, residing at Milwaukee, in the county of Milwaukee and State of Wisconsin, have invented certain new and useful Improvements in Turbo-Rotor Construction, of which the following is a full, clear, and exact specification.

My invention relates to dynamo-electric machines, and particularly to the rotating members of turbo-generators.

Considerable difficulty has been experienced in supporting the collector leads of high speed rotary members so that they will not be broken by the action of centrifugal force, or disconnected from the winding or collector rings.

The object of my invention is to provide a novel collector lead construction which can be employed in machines of any size or speed without any danger of being injured or broken by the action of centrifugal force.

With this end in view my invention consists in certain novel details of construction and combinations and arrangements of parts which will be fully described in the specification and set forth in the appended claims.

Referring now to the drawing, Figure 1 is a partial sectional elevation of a rotating field member of an alternator equipped with my invention; Fig. 2 is a similar elevation showing a few modifications of my invention; and, Fig. 3 is a partial end view of the modifications shown in Fig. 2.

Mounted on the shaft 10 is a core 11, which is slotted and provided with a winding, the end portions of the coils of which are shown at 12. The ends of the coils are inclosed within an end shield or cover consisting, in this case, of a ring or annular member 13 which surrounds the coils and an annular end disk or plate 13ª mounted on the shaft. The ring 13 is supported on the edge of the core 11 and also upon the annular disk 13ª. Located at one end of the shaft and mounted thereon, are the collector rings 15 and 16. As here shown, the rings are mounted on a cone-shaped sleeve 17 and are clamped thereon by a nut 18. If desired, the two collector rings may be mounted one at each end of the shaft, instead of both being mounted at the same end, and may be supported directly on the shaft.

Mounted on the shaft in Fig. 1 within the rotor and between the disk 13ª and the rotor core 11 are two annular members or disk-like rings 19 and 20, and mounted on the shaft outside of the rotor between the disk 13ª and sleeve 17 is another annular member 21. The annular member 21 may be shrunk on the shaft or may be forced on when cold by means such as hydraulic pressure. The annular members are made of strong material such as nickel steel so as to be able to withstand the stresses due to centrifugal force without bursting. The annular disks 19 and 20 are provided with registering grooves to receive the collector lead 22. Two other registering grooves in the same annular disks to receive the other collector lead are 180° from the first mentioned grooves. In this particular case the grooves run radially inward toward the shaft, but I do not intend to limit myself to having the grooves run in any one certain direction. With the collector leads set in place the two disks 19 and 20 are clamped or bolted together. The disks are also clamped in between the core 11 and end disk 13ª. The end-disk 13ª is provided with two openings, one of which is shown at 23, to receive the collector leads. In this case the two openings are 180° apart. The angular spacing of the openings and the collector leads, however, may be different, depending upon the positions of the positive and negative terminals of the winding. The annular member 21 is provided with two openings, one of which is shown at 24, which correspond in location to the two openings in the end disk 13ª and are in axial alinement. The collector rings 15 and 16 are provided with an opening 25 in axial alinement with openings 24 and 23 in the annular member 21 and end-disk 13ª. Collector ring 16 is also provided with another opening, in this case 180° from above mentioned openings. There are also openings in the annular member 21 and end disk 13ª in axial alinement with the last mentioned opening in collector ring 16. Fitting tightly in these two sets of openings in axial alinement and in the grooves of the annular disks 19 and 20 are the collector leads, one of which, 22, is shown. The lead 22 is provided with an insulating sleeve 26 which insulates it from collector ring 16, the annular member 21 and from part of the end disk 13ª. It is to be noted the sleeve 26 fits into end disk 113

13ª and is a construction more particularly for high speeds. The connector is further insulated from the end-disk 13ª and annular-disks 19 and 20. A wedge 28 is provided to fit the shaft and to hold the lead 22 in a stable position.

Referring now to Fig. 2, a steel tube 27 has been provided to support and strengthen the conductor which passes through the said tube and annular supporting member 21 and insulated therefrom. A small sleeve 31 has also been provided, of some insulating material such as micanite, to be driven into the steel tube. This micanite will prevent any creeping which might otherwise occur. The steel tube is held tight by means of the set screw 32. Another very novel way for supporting the collector lead, can be made use of in connection with the end-disk 13ª. The end-disk can be made in two pieces but preferably in one. The end-disk is provided with an aperture 33 and is also milled out to dimensions sufficiently large to allow for the reception of collector lead 22, insulation around the same and a plate 34. The plate 34 and end-disk 13ª are properly grooved to hold the collector lead in one position. The plate is grooved out at 35 to allow the lead to be passed through and is bolted to the end-disk 13ª. A wedge 36, fitting the shaft is used to hold the lead 22 rigidly.

The constructions are so rigid and all the parts are so well supported that there is no danger of any of said parts being injured or displaced or the connections between the winding and the collector rings broken.

The construction and arrangement here shown can be modified to a considerable extent without departing from the scope of my invention, and I aim in my claims to cover all such modifications.

What I claim as new and desire to secure by Letters Patent is:—

1. In the rotor of a dynamo-electric machine, the combination of a shaft, a core mounted on said shaft, a winding carried by said core, a collector ring, a plurality of annular supports, one comprising coöperating grooved members, a collector lead supported by said annular supports and connecting said winding and said collector ring.

2. In the rotary member of a dynamo-electric machine, the combination of a shaft, a core mounted on said shaft, a winding carried by said core, a collector ring, a collector lead connecting said winding and collector ring, and a plurality of annular supports for said collector lead, one of said supports comprising a pair of grooved disks.

3. In the rotary member of a dynamo-electric machine, the combination of a shaft, a core mounted on said shaft, a winding carried by said core, a collector ring, a collector lead connecting said winding and said collector ring, and means for supporting said collector lead in a radial direction, said means consisting of a pair of grooved disks between which the lead is secured.

4. In the rotary member of a dynamo-electric machine, the combination of a shaft, a core mounted on said shaft, a winding carried by said core, an inclosing end cover protecting said winding, a collector ring, a collector lead connecting said winding and said collector ring, and a pair of grooved disks within said end cover supporting said collector lead.

5. In the rotary member of a dynamo-electric machine, the combination of a shaft, a core mounted thereon, a winding carried by said core, said winding having end turns projecting beyond the core, an end cover protecting the end turns of said winding, an annular support having an aperture and mounted on said shaft, a collector ring, a sleeve located in said aperture and engaging said end cover, a pair of grooved disks, and a collector lead passing through said sleeve and said grooved disks and connecting said winding and ring.

6. In the rotor of a dynamo-electric machine, the combination of a shaft, a core mounted on said shaft, a winding carried by said core, an end cover protecting said winding, an annular support provided with an aperture and located outside of said cover, a sleeve extending through said aperture, grooved supporting members within said cover, a collector ring, a collector lead connecting said winding and collector ring and clamped between said grooved supporting members and passing through said sleeve.

7. In a dynamo-electric machine, the combination of a rotor winding, a collector ring, a collector lead connecting said winding and collector ring, and a pair of grooved disks between which the lead is secured.

8. In a dynamo-electric machine, the combination of a rotor winding, an end cover protecting said winding, a collector ring, a collector lead connecting said winding and said ring, and a pair of grooved disks within said cover and between which the lead is secured.

In testimony whereof I affix my signature, in the presence of two witnesses.

SÖREN H. MORTENSEN.

Witnesses:
H. C. CASE,
CHAS. L. BYRON.